United States Patent
Nozaki et al.

[11] Patent Number: 5,563,983
[45] Date of Patent: Oct. 8, 1996

[54] LEARNING SYSTEM OPERATED THROUGH A LAYERED NEURAL NETWORK

[75] Inventors: Chikanori Nozaki; Junko Murai; Yoshihiro Nakatani, all of Kawasaki, Japan

[73] Assignee: Fujitsu Limited, Kawasaki, Japan

[21] Appl. No.: 436,602

[22] Filed: May 8, 1995

Related U.S. Application Data

[63] Continuation of Ser. No. 94,444, Jul. 21, 1993, abandoned.

[30] Foreign Application Priority Data

Jul. 21, 1992 [JP] Japan .................................. 4-193642

[51] Int. Cl.$^6$ .................................................. G06F 15/18
[52] U.S. Cl. ................................................ 395/23; 395/24
[58] Field of Search ................................... 395/22, 23, 24

[56] References Cited

U.S. PATENT DOCUMENTS 5,109,475  4/1992  Kosaka et al. ............................ 395/22

OTHER PUBLICATIONS

Stock Market Prediction System with Modular NN Kimoto et al. IEEE 17–21 Jun. 1990.
Neural Sequential Associator and its Application to Stock Price Prediction Matsuba, IEEE 28 Oct.–1 Nov. 1991.
Using NN to predict several sequential and subsequent future values from time series data J. E. Bowen, IEEE/9–11 Oct. 1991.
Non–Linear System Diagnosis using NN and Fuzzy Logic Choi et al. IEEE International Conference on Fuzzy Systems Mar. 1992.

*Primary Examiner*—Allen R. MacDonald
*Assistant Examiner*—Richemond Dorvil
*Attorney, Agent, or Firm*—Armstrong, Westerman, Hattori, McLeland & Naughton

[57] ABSTRACT

The present invention predicts an output result in response to unknown input data using a layered neural network. For example, learning data collected in time series with rate of changes included are learned through the layered neural network. As a result, a predicted value can be obtained with a smaller amount of learning data within a shorter learning time. The present invention comprises a rate of change calculating unit for calculating the rate of change of time-series data at two different time points, and a network generating unit for controlling the learning steps performed by the layered neural network using at least the rate of change of data as learning data so as to establish a neural network in which a weight value is determined for learning data. As a predicting system, it further comprises at least a neural network recognizing unit for applying to the neural network established by the network generating unit an output of the rate of change calculating unit outputted in response to input predicting data, and for obtaining a prediction result.

10 Claims, 15 Drawing Sheets

| PROBREM<br>(VALUE OF X) | CORRECT ANSWER<br>(VALUE OF Y) | OUTPUT | DIFFERENCE |
|---|---|---|---|
| 0.3 | 0.7 | 0.686 | 0.014 |
| 0.2 | 0.8 | 0.748 | 0.052 |
| 0.1 | 0.9 | 0.793 | 0.107 |

AVERAGE ERROR 0.058

Fig. 2

| PROBREM (VALUE OF X) | CORRECT ANSWER (VALUE OF Y) | OUTPUT | DIFFERENCE |
|---|---|---|---|
| 0.3 | 0.7 | 0.727 | 0.026 |
| 0.2 | 0.8 | 0.803 | 0.003 |
| 0.1 | 0.9 | 0.856 | 0.044 |

AVERAGE ERROR 0.024

Fig. 3

| NO | UNIT IN INPUT LAYER | | UNIT IN OUTPUT LAYER |
|---|---|---|---|
| | RATE OF CHANGE OF X | VALUE OF X | RATE OF CHANGE OF Y |
| 1 | 0.111 | 0.8 | −1.0 |
| 2 | 0.125 | 0.7 | −0.5 |
| 3 | 0.143 | 0.6 | −0.33 |
| 4 | 0.167 | 0.5 | −0.25 |
| 5 | 0.2 | 0.4 | −0.2 |

Fig. 9

| NO | UNIT IN INPUT LAYER ||
|---|---|---|
| | RATE OF CHANGE OF X | VALUE OF X |
| 1 | 0.25 | 0.3 |
| 2 | 0.333 | 0.2 |
| 3 | 0.5 | 0.1 |

Fig. 10

| PROBLEM (VALUE OF X) | CORRECT ANSWER (VALUE OF Y) | OUTPUT | DIFFERENCE |
|---|---|---|---|
| 0.3 | 0.7 | 0.678 | 0.022 |
| 0.2 | 0.8 | 0.780 | 0.020 |
| 0.1 | 0.9 | 0.884 | 0.016 |

AVERAGE ERROR 0.019

Fig. 11

| CONTENTS OF INPUT UNIT | | NUMBER OF INPUT UNITS |
|---|---|---|
| EXCHANGE RATE INFORMATION | TENDENCY | 9 |
| | FLUCTUATION WIDTH | 9 |
| | RATE OF CHANGE | 12 |
| | ACTUAL VALUE | 3 |
| INTEREST INFORMATION | TENDENCY | 6 |
| | FLUCTUATION WIDTH | 9 |
| | RATE OF CHANGE | 3 |
| INFORMATION OF GOVERNMENT BOND<br>INFORMATION OF PRICE<br>INFORMATION OF INDEX<br>INFORMATION OF STOCK MARKET | RATE OF CHANGE | 16 |

TOTAL 67

Fig. 13A

| CONTENTS OF OUTPUT UNIT | | NUMBER OF OUTPUT UNITS |
|---|---|---|
| MAXIMUM VALUE OF EXCHANGE RATE | RATE OF CHANGE | 1 |
| MINIMUM VALUE OF EXCHANGE RATE | RATE OF CHANGE | 1 |
| ENDING VALUE OF EXCHANGE RATE | RATE OF CHANGE | 5 |

TOTAL 7

| NAME OF PREDICTION MODEL | PREDICTION MODEL 1 | DISPLAY PERIOD | OCTOBER 16, 1991 - NOVEMBER 5, 1991 |
|---|---|---|---|

(1/2)

| SUBJECT TO BE PREDICTED | | PREDICTED ENDING VALUES (LIST) | | | |
|---|---|---|---|---|---|
| DATE | ACTUAL VALUE (YEN) | PREDICTED VALUE (YEN) | ERROR (YEN) | ABSOLUTE VALUE OF ERROR (YEN) | UPTURN OR DOWNTURN CORRECTLY PREDICTED? |
| OCT. 16, 1991 | 130.10 | 130.31 | 0.21 | 0.21 | |
| OCT. 17, 1991 | 129.40 | 129.87 | 0.47 | 0.47 | ○ |
| OCT. 18, 1991 | 129.90 | 129.14 | -0.76 | 0.76 | × |
| OCT. 21, 1991 | 130.65 | 129.59 | -1.06 | 1.06 | × |
| OCT. 22, 1991 | 131.40 | 130.89 | -0.51 | 0.51 | ○ |
| OCT. 23, 1991 | 131.65 | 131.49 | -0.16 | 0.16 | ○ |
| OCT. 24, 1991 | 131.30 | 131.18 | -0.12 | 0.12 | ○ |
| OCT. 25, 1991 | 131.45 | 131.33 | -0.12 | 0.12 | ○ |
| OCT. 28, 1991 | 132.35 | 131.62 | -0.73 | 0.73 | ○ |
| OCT. 29, 1991 | 130.65 | 132.58 | 1.93 | 1.93 | × |
| OCT. 30, 1991 | 130.95 | 130.46 | -0.49 | 0.49 | × |
| OCT. 31, 1991 | 130.95 | 131.10 | 0.15 | 0.15 | — |
| NOV. 1, 1991 | 129.70 | 130.88 | 1.18 | 1.18 | ○ |
| NOV. 4, 1991 | 129.20 | 129.42 | 0.22 | 0.22 | ○ |
| NOV. 5, 1991 | 130.00 | 129.24 | -0.76 | 0.76 | ○ |

LEARNING SYSTEM OPERATED THROUGH A LAYERED NEURAL NETWORK

This application is a continuation application of Ser. No. 08/094,444 filed Jul. 21, 1993, now abandoned.

BACKGROUND OF THE INVENTION

1. Field of the Invention

The present invention relates to a system of predicting an output result in response to unknown input data using a layered neural network, and more specifically to a learning method operated through a layered neural network for learning data including the rate of change of data inputted in time series.

2. Description of the Related Art

In a learning process performed using a layered neural network comprising an input layer, one or more intermediate or hidden layers, and an output layer, the steps of (1) applying input data, (2) outputting a result of a neural network, (3) presenting a correct answer, (4) calculating an error between the output result and the correct answer, and (5) adjusting the weight of each connection to minimize the error are repeatedly performed until the error can be sufficiently minimized. In such a learning method, a neural network can gradually reach and output a desired answer. That is, when a learning process is completed, the neural network stores a correct relationship value between an input and an output by successfully adjusting the weight of a connection.

Conventionally, unprocessed data are applied as learning data to a neural network. FIG. 1 shows an example of such learning data. It shows the data with nine black dots on the line represented by the function Y =1−X. A value of X for the black dots is applied to a neuron in the input layer. Then, a learning process starts to minimize the difference between an output of a neuron in the output layer and the value of Y.

FIG. 2 shows recognition results obtained after the neural network has learned only a part of nine-dot data shown in FIG. 1. It shows the recognition results of the values of Y for the three dots where the values of X are 0.1 through 0.3 after the neural network has learned the data of six dots where the values of X are 0.1 through 0.6. In this case, the average value of the resultant errors is 0.058.

FIG. 3 shows a recognition result after the neural network has learned the data shown in FIG. 1, that is, all the nine-dot data. In FIG. 3, the neural network learns the same data as those shown in FIG. 2, but it outputs an average error value 0.024, which is much better than that shown in FIG. 2 where only partial data were learned.

Thus, in a learning process through a layered neural network, it is desirable to provide all the predictable patterns as learning data. However, it is actually impossible to prepare all patterns. Especially, in a predicting system for processing time-series data, it is very difficult to obtain a precise and reliable result by learning partial data.

SUMMARY OF THE INVENTION

The present invention aims at processing time-series data including a rate of change, i.e. the differential through a neural network with smaller amount of learning data within a shorter learning time.

A feature of the present invention resides in learning system operated through a layered neural network having an input layer, one or more hidden layers, and an output layer comprising rate of change calculating unit for calculating the rate of change of given data and network generating unit for controlling the learning processes performed through said layered neural network by applying learning data containing said calculated rate of change of data to said network, and establishing a layered neural network in which a weight value is determined for said learning data.

BRIEF DESCRIPTION OF THE DRAWINGS

One skilled in the art can easily understand additional features and objects of this invention from the description of the preferred embodiments and some of the attached drawings. In the drawings:

FIG. 2 shows a recognition result of the learning data shown in FIG. 1 as a part of them being learned;

FIG. 3 shows a recognition result of the learning data shown in FIG. 1 after all of them being learned;

FIG. 9 shows an embodiment of a process performed on the learning data shown in FIG. 1 according to the present invention;

FIG. 10 shows an embodiment of recognition data obtained after learning the data shown in FIG. 9;

FIG. 11 shows a recognition result from the recognition data shown in FIG. 10;

FIG. 13A and 13B show examples of an input to an input unit and an output from an output unit in an exchange rate predicting system;

FIG. 14 shows an example of an actual prediction result; and

DESCRIPTION OF THE PREFERRED EMBODIMENTS

Figure 4:
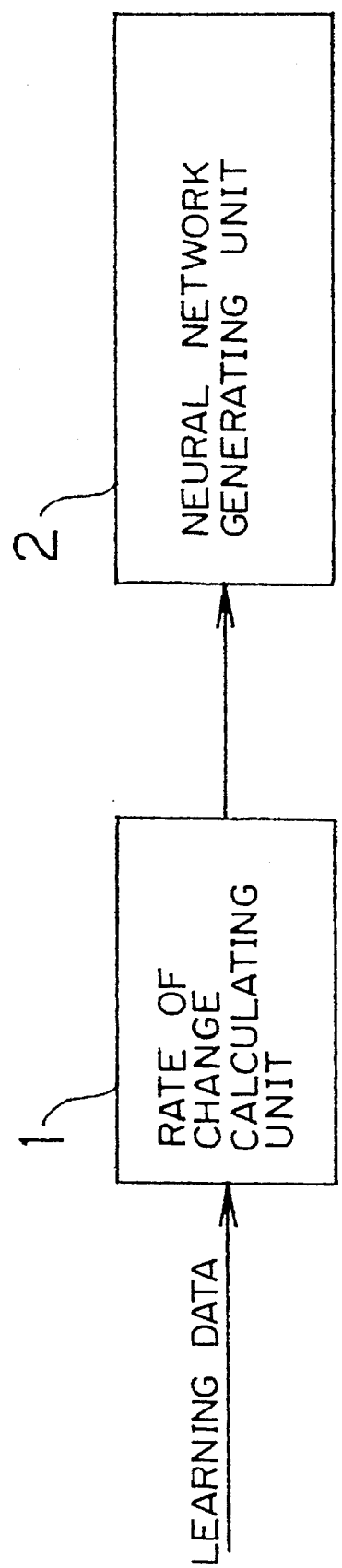
FIG. 4 is a bock diagram showing the principle of the present invention.

FIG. 4 is a block diagram for explaining the principle of the present invention. It shows a learning method through a layered neural network comprising an input layer, one or more hidden layers, and an output layer in which learning data including a data rate of change are processed efficiently.

In FIG. 4, a rate of change calculating unit 1 calculates a rate of change, i.e. the differential of data collected by, for example, a data collecting unit. The calculated rate of change is given to a neural network generating unit 2 together with actual data as an actual value. The neural network generating unit 2 controls a learning process performed through a layered neural network, and generates a neural network in which a weight value for each piece of learning data is determined.

According to the present invention, actual data and a rate of change obtained from the actual data are provided for a neural network as described above. In an example shown in FIG. 1, rate of changes of X and Y are calculated by the rate of change calculating unit 1 for data of adjacent black dots. An actual value of X and a rate of change of X are given to two neurons in the input layer. A rate of change of Y as teaching data is compared with an output of a single neuron in the output layer. Thus, since a rate of change is provided as learning data in addition to actual data, data can be predicted in time series. However, as an absolute value of a rate of change can be extremely large, the upper and lower limits of a rate of change are predetermined, and a normalized neural network.

Figure 5:
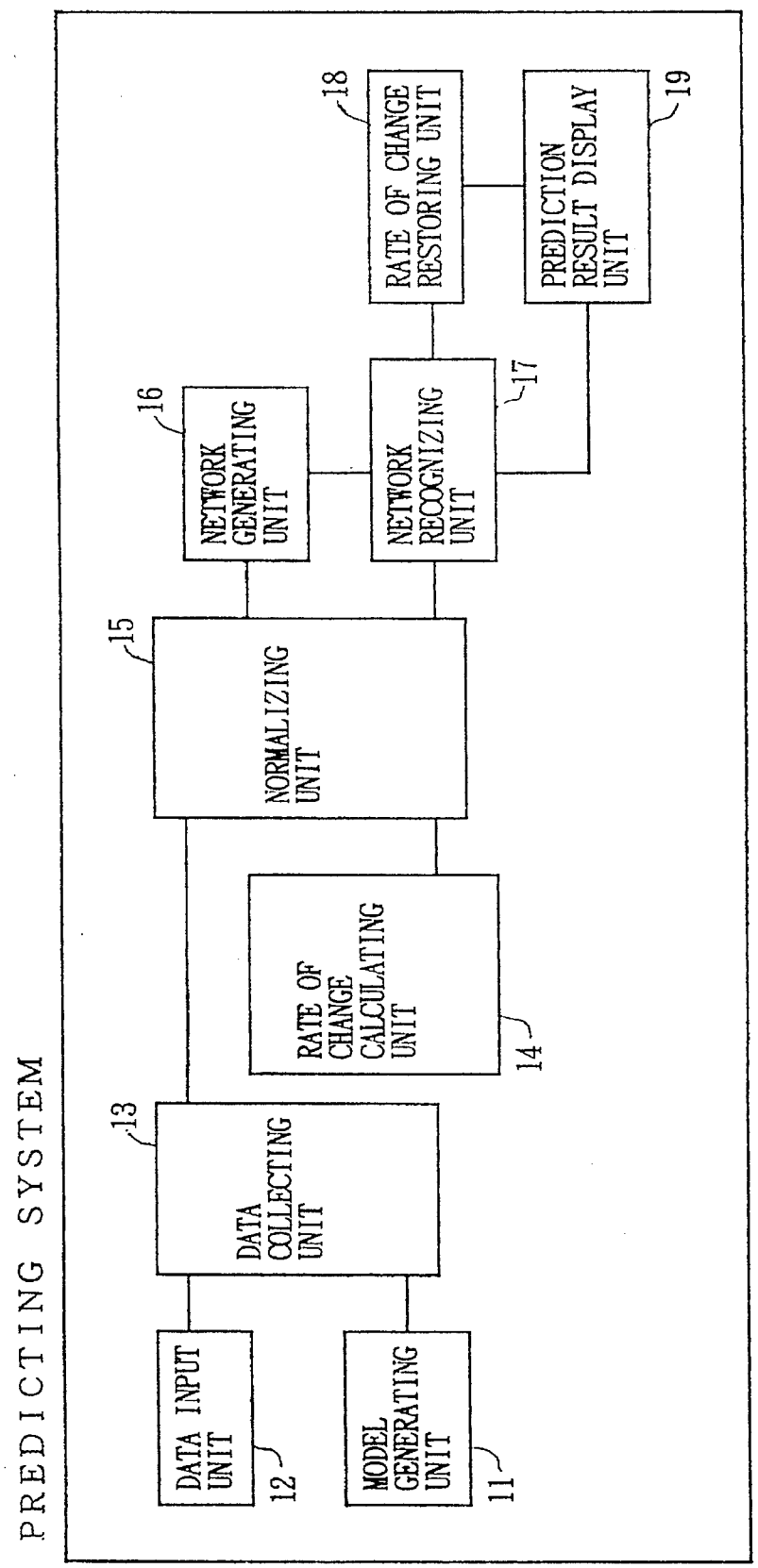
FIG. 5 is a block diagram showing the configuration of a predicting system operated with the learning method according to the present invention.

FIG. 5 is a block diagram showing the configuration of a predicting system operating through a neural network according to the learning method of the present invention. In FIG. 5, the system comprises a model generating unit 11 for generating a model in a predicting system comprising a neural network, a data input unit 12 for applying input data in response to a generated model, a data collecting unit 13 for collecting data outputted by the model generating unit 11 and the data input unit 12 and applied to a neural network, a rate of change calculating unit 14 for calculating a rate of change from actual data when rate of change data are applied together with actual data to a neural network, a normalizing unit 15 for normalizing data to be provided for a neural network to a value between 0.1 and 0.9 based on the outputs of the data collecting unit 13 and/or the rate of change calculating unit 14, a network generating unit 16 for controlling a learning process performed through a neural network according to an output of the normalizing unit 15, determining a weight value in the network, and thus generating the entire network, a network recognizing unit 17 for having a neural network recognize input recognition data provided by the normalizing unit 15 using a neural network generated by the network generating unit 16, a rate of change restoring unit 18 for restoring a rate of change to actual data when recognition data outputted by the network recognizing unit 17 contains a rate of change, and a prediction result display unit 19 for displaying a prediction result in response to the output of the network recognizing unit 17 and/or the rate of change restoring unit 18.

Figure 6:
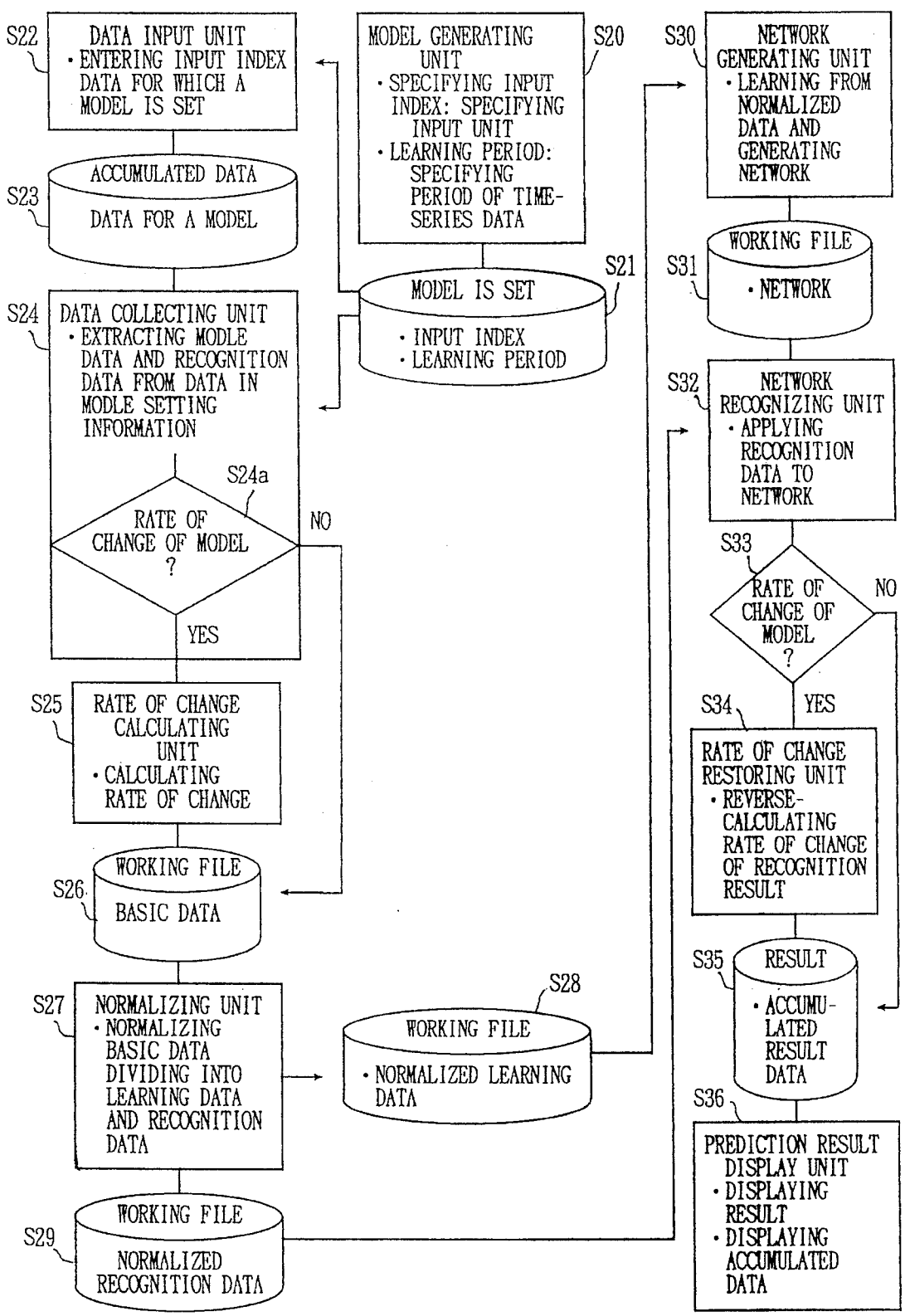
FIG. 6 is a flowchart showing the process of an embodiment using the learning method according to the present invention.

FIG. 6 is a flowchart showing an example of a process performed through the predicting system shown in FIG. 5. In FIG. 6, the model generating unit 11 determines an input index and learning period in step S20. That is, in the rate of exchange in the financial predicting system described later, the maximum, minimum, and ending values of the day, and a rate of change of the ending value to that of the previous day are specified as input indices, according to which the number of input units is determined.

Furthermore, an input index data process method is specified. A process method indicates whether or not data specified by an input index are to be preprocessed. If no, it is specified that actual data are directly processed. If yes, a rate of change or an average value is calculated.

A learning period specifies the duration (the number of days) for which data of an exchange rate are used as time-series data. In step S21, a specified model, that is, an input index and learning duration, the number of times of executing a learning process, the number of the intermediate units, etc. are stored in a memory.

In step S22, the data input unit 12 enters input index data for a specified model, and the data are stored as accumulated data in a memory in step S23.

Then, in step S24, the data collecting unit 13 extracts learning data and recognition data for a specified model. In step S24a, it is determined whether or not a specified model contains a rate of change, that is, a rate of change is to be used in a process. If yes, the rate of change calculating unit 14 calculates a rate of change in step S25, and the result is stored as basic data in a working file together with learning data and recognition data in step S26. If it is determined that a model contains no rate of change in step S24a, then learning data and recognition data are stored in a working file in step S26 without calculating a rate of change.

Next, in step S27, the normalizing unit 15 normalizes basic data including a rate of change stored in a working file. In the normalization, basic data are normalized to 0.1 through 0.9, and the normalized data are divided into learning data and recognition data. The learning data are stored as normalized learning data in a working file in step S28, and the recognition data are stored as normalized recognition data in a working file in step S29.

In step S30, the network generating unit 16 performs a learning process on normalized learning data stored in a working file, generates a network in which a weight value is determined as a result of the learning process. Then, the working file stores the network in step S31.

Through the generated network, the network recognizing unit 17 recognizes data in step S32. That is, in step S29, the normalized recognition data stored in the working file are entered, and a stored in the working file are entered, and a recognition result is outputted. If a predicted model contains a rate of change, a recognition result is outputted as containing a rate of change. Therefore, in step S33, it is determined whether or not a model contains a rate of change. If yes, the rate of change restoring unit 18 obtains the rate of change contained in the recognition result to restore actual data through the rate of change in step S34. The restoration result is stored together with outputted recognition result excluding a rate of change as accumulated result data in a memory in step S35. In step S33, if the model is determined not to contain a rate of change, then a recognition result obtained in step S32 is stored as accumulated result data in a memory in step S35.

Finally, in step S36, the prediction result display unit 19 displays a prediction result. Generally, since an output of a neural network, that is, a recognition result, is outputted as normalized data, reverse normalization is performed prior to the display of a prediction result. Furthermore, a conventional prediction result, that is, accumulated data, is also displayed if necessary.

Figure 7:
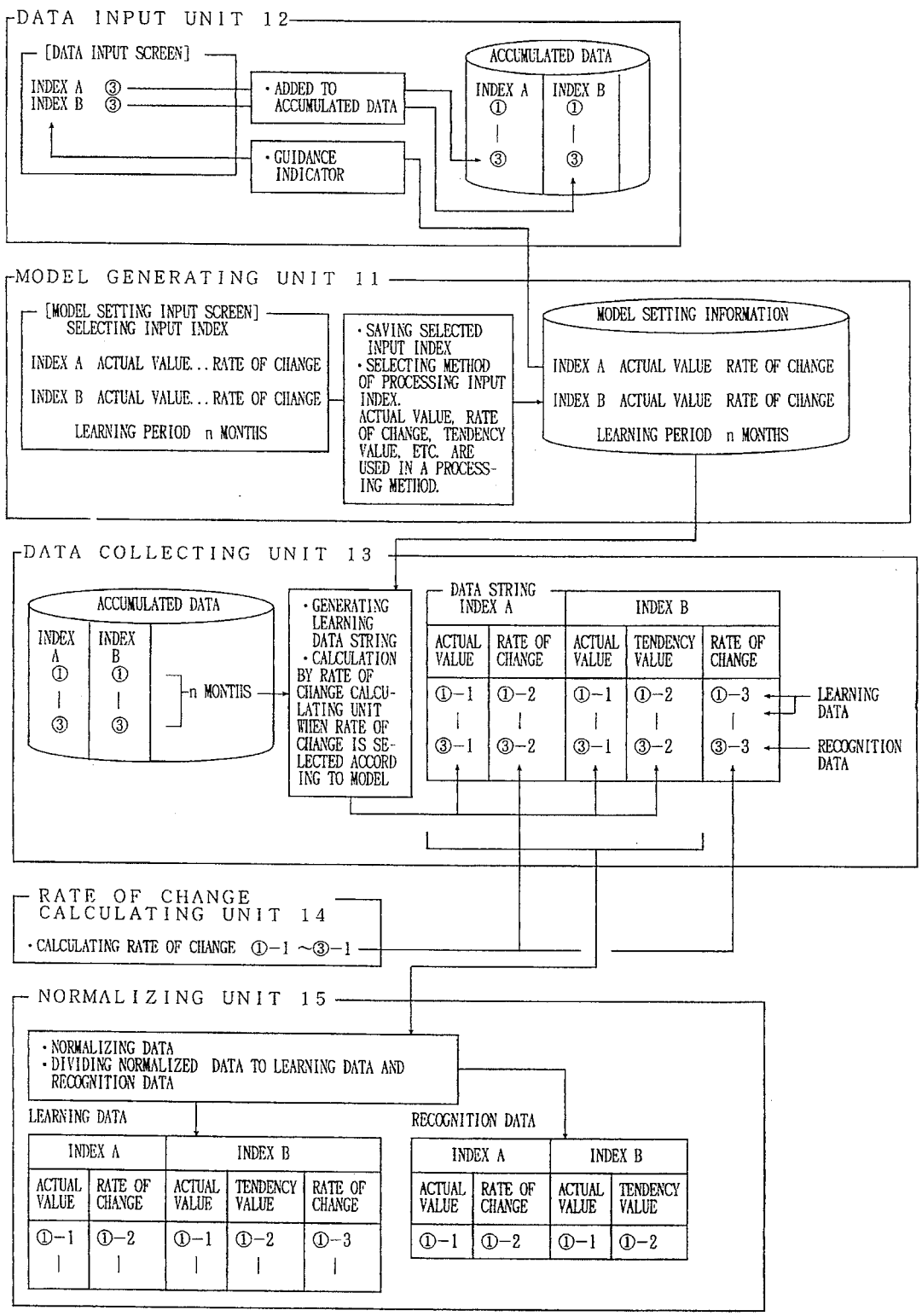
FIG. 7 shows the first operations of each components of the predicting system shown in FIG. 5.
Figure 8:
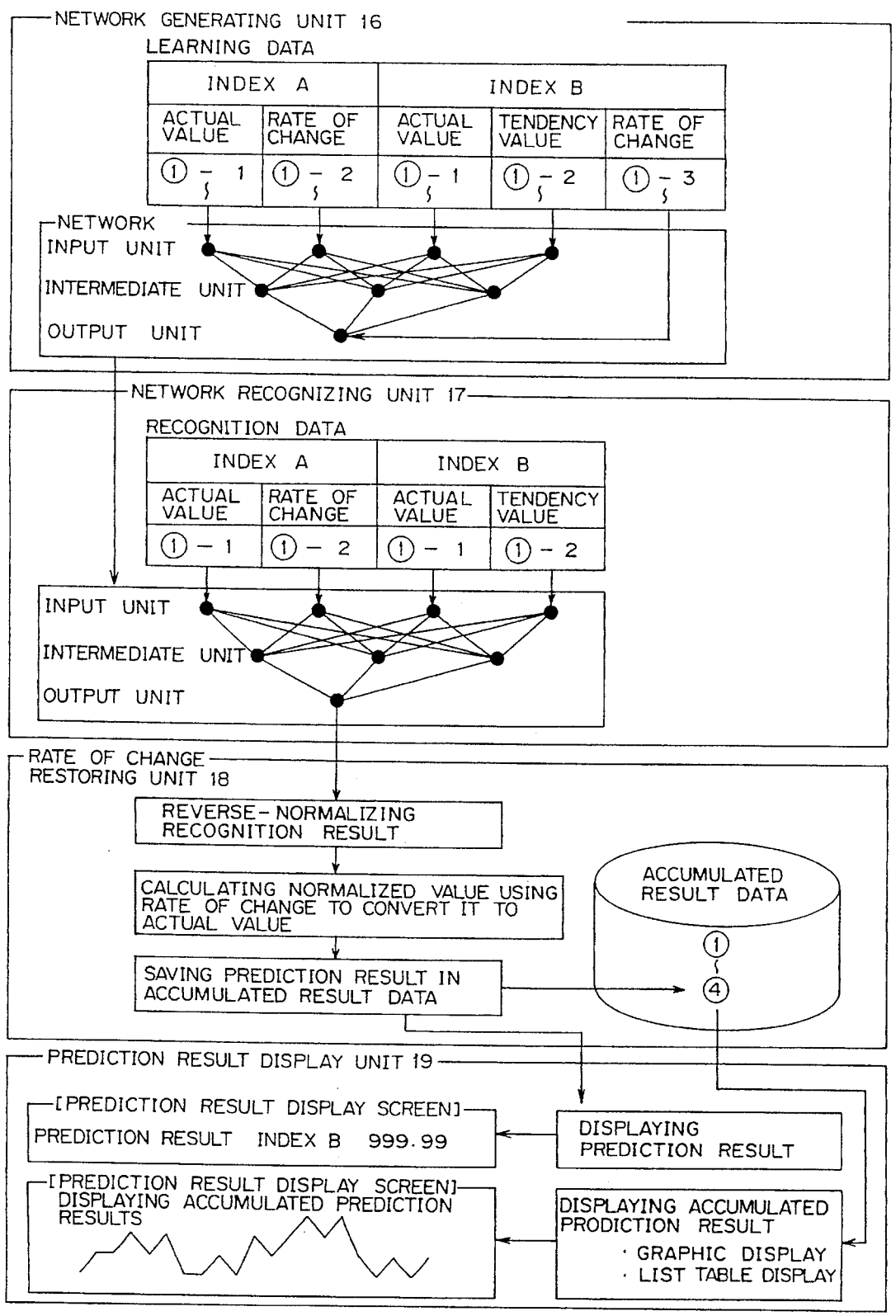
FIG. 8 shows the second operations of each components of the predicting system shown in FIG. 5.

FIGS. 7 and 8 respectively show the operations of each components of the predicting system shown in FIG. 5. In FIG. 7, the data input unit 12 adds, to the accumulated data in a memory, data ③ of index A and data ③ of index B inputted according to the guidance indicator of an input index in model setting information. The input index is labeled A or B, and a prediction target is represented by index B.

On the other hand, the model generating unit 11 selects an input index applied through the model setting input screen, the selected input index is saved, and a method of processing the input index is selected. The processing method can be performed based on an actual value, a rate of change, a tendency value, etc. In the present embodiment, an actual value, a rate of change, and "n" months as a learning period are provided for input indices A and B as model setting information and are stored in a memory.

Then, the data collecting unit 13 generates a learning data string from the contents of the memory storing the model setting information, and collects recognition data. If a rate of change is used for a predicted model, then the rate of change calculating unit calculates a necessary rate of change.

The learning data collected by the data collecting unit 13, recognition data, and a rate of change calculated by the rate of change calculating unit 14 according to the above described actual data values are applied to the normalizing unit 15. The normalizing unit 15 normalizes data, and divides the normalized data into learning data and recognition data. The result input indices A and B are provided with learning data and recognition data.

FIG. 8 shows the operation performed after the network generating unit 16. First, the network generating unit 16 applies normalized learning data to the layered neural network, and the network starts learning. In this embodiment, an actual value and a rate of change for index A and an actual value and a tendency value for index B are inputted to four input units separately. The rate of change for index B is compared as teaching data with the output of one output unit to perform learning through the neural network.

Then, the network recognizing unit 17 recognizes the neural network generated by the network generating unit 16 according to the normalized recognition data. That is, the rate of change for index B is predicted.

The recognition result of the network recognizing unit 17 is applied to the rate of change restoring unit 18. Then, the reverse normalization of the recognition result is performed and a reverse-normalized value is obtained. That is, a rate of change is converted to a corresponding actual value. The conversion result is stored as accumulated result data in a memory. The prediction result is displayed on the prediction result display screen by the prediction result display unit 19. Thus, the accumulated prediction result is displayed together with the accumulated result data stored in the memory in the format of a prediction result accumulation display, that is, a graphic display, or a list format.

In FIG. 6, since a recognition result is stored in a memory in step S35 without the process in step S34 performed by the rate of change restoring unit when a predicted model is not processed with a rate of change in step S33, the reverse normalization of a recognition result is performed by the prediction result display unit in step S36. However, in FIG. 8, since the number of output units in the neural network is only one and outputted is a rate of change for index B, the operations of all components are described such that the reverse normalization of the recognition result is performed by the rate of change restoring unit 18.

Next, the calculation of a rate of change is explained according to the present embodiment. In FIG. 5, the rate of change calculating unit 14 calculates a rate of change, if necessary, on data collected by the data collecting unit 13. If the range of an absolute value of a rate of change is exceedingly large, then, for example, upper and lower limits are determined so that the absolute value can be within a predetermined range.

Data to be provided for a neural network contain, for example, time-series data $Z_1, Z_2, \ldots, Z_{n-1}, Z_n$, and their rate of change $FZ_n$. Generally, a rate of change $FZ_n$ of data $Z_n$ is calculated by one of the following five equations. Where a rate of change for adjacent two time-series data $Z_n$ and $Z_{n-1}$ is calculated. However, the two time-series data do not necessarily have to be adjacent to each other.

$$FZ_n=(Z_{n-1}-Z_n)/Z_{n-1}$$

$$FZ_n=(Z_{n-1}-Z_n)/Z_n$$

$$FZ_n=(Z_n-Z_{n-1})/Z_{n-1}$$

$$FZ_n=(Z_n-Z_{n-1})/Z_n$$

$$FZ_n=(Z_n-Y)/Y$$

where Y is a constant base value.

A rate of change $FZ_{n+1}$ of a value $Z_{n+1}$ (to be predicted) next to the time-series data can be calculated by one of the following three equations.

$$FZ_{n+1}=(Z_{n+1}-Z_n)/Z_n$$

$$FZ_{n+1}=(Z_n-Z_{n+1})/Z_n$$

$$FZ_{n+1}=(Z_n Y)/Y$$

According to the present invention, data outputted by the units in the output layer (neuron) are applied after being processed according to a rate of change, and an actual value is restored according to the rate of change. Actual data $Z_n$ restored from data outputted as $FZ_n$ are calculated as follows, for example.

$$Z_n=Z_{n-1}+Z_{n-1}\times FZ_n$$

All the data in the above equation indicate actual values not normalized at all.

Figure 1:
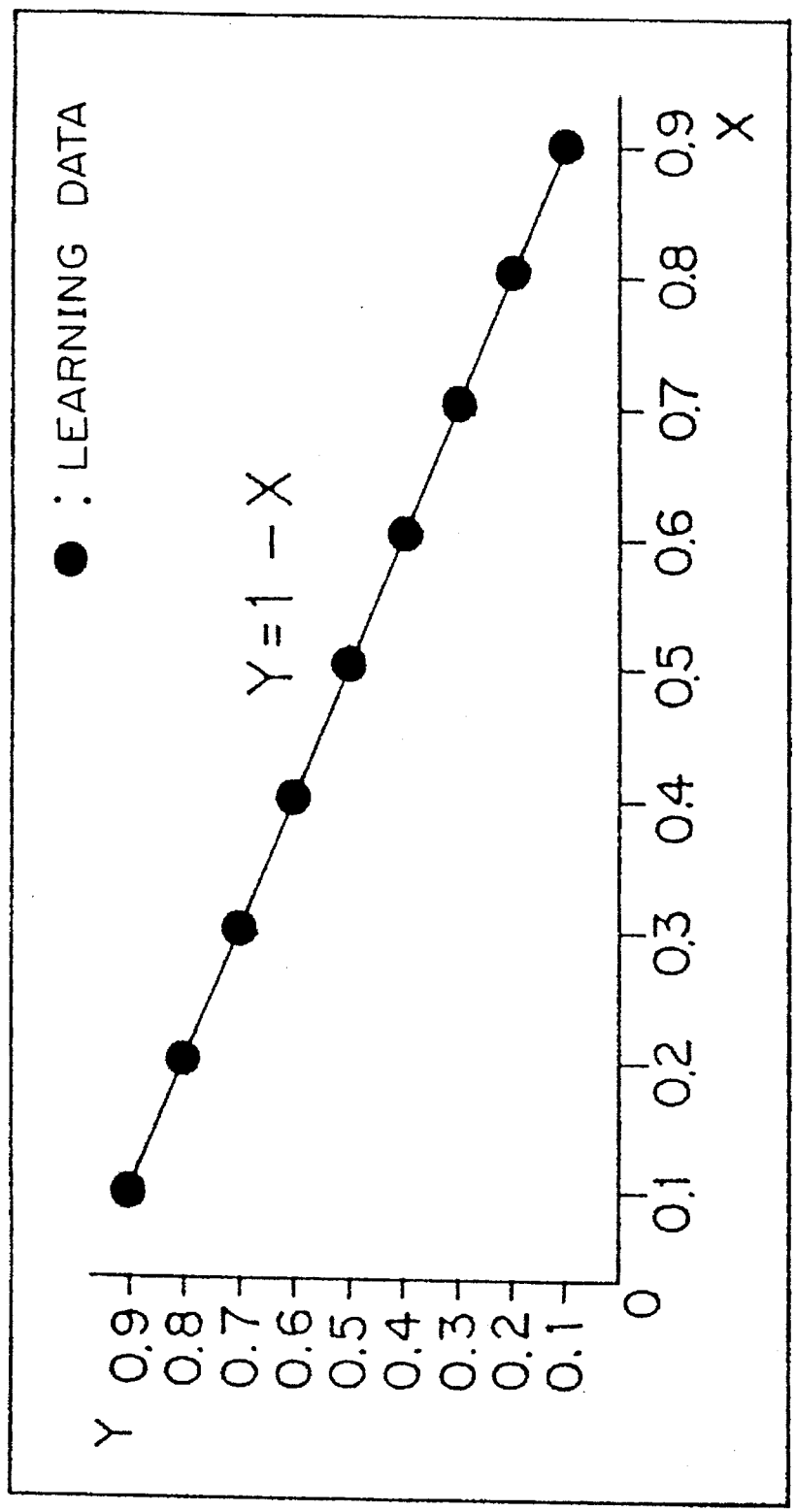
FIG. 1 shows an example of learning data processed by a neural network.

FIG. 9 shows an example of learning data for the example shown in FIG. 1 according to the present invention. In FIG. 9, the black dots are given sequentially from the value X=0.9 as learning data. The number of units in the input layer is two, the units are provided with the value of X and its rate of change, and a single unit in the output layer outputs a rate of change of Y. The data of No.1 indicate a rate of change of X based on $X_n=0.8$ and $X_n-1=0.9$, thereby yielding a rate of change of Y. The resultant learning data are provided for a neural network after being normalized as described above.

FIG. 10 shows an example of the embodiment of recognition data given to a neural network after a learning process with the learning data shown in FIG. 9. The recognition data, that is, an actual value of X and its rate of change, are given to each of the two units in the input layer as described above.

FIG. 11 shows a recognition result of the recognition data shown in FIG. 10. In this case, an average value of errors is 0.019, which shows an improved recognition precision as being compared with the conventional method shown in FIG. 3 in which all data are learned without a rate of change.

The normalizing unit 15 shown in FIG. 5 normalizes by the following equation. The data processed by the normalization, that is, the data provided for the neural network, are within the range 0.1 through 0.9.

$$NZ = \frac{Z - \text{minimum value}}{\text{maximum value} - \text{minimum value}} \times 0.8 + 01.$$

where Z indicates data before being normalized, and NZ indicates normalized data. In the equation, the maximum and minimum values are those in all data applied to the units in the input layer. The data applied to the units in the output layer can be optionally determined by a user if the data are subject to the fluctuation in a rate of change such as an exchange rate described later.

Furthermore, the output of a neural network is obtained as a generally normalized actual value Z by reverse-normalizing a normalized value, and is practically calculated as follows.

$$Z = \frac{NZ - 0.1}{0.8} \text{ (maximum value − minimum value)} + \text{minimum value}$$

Figure 12:
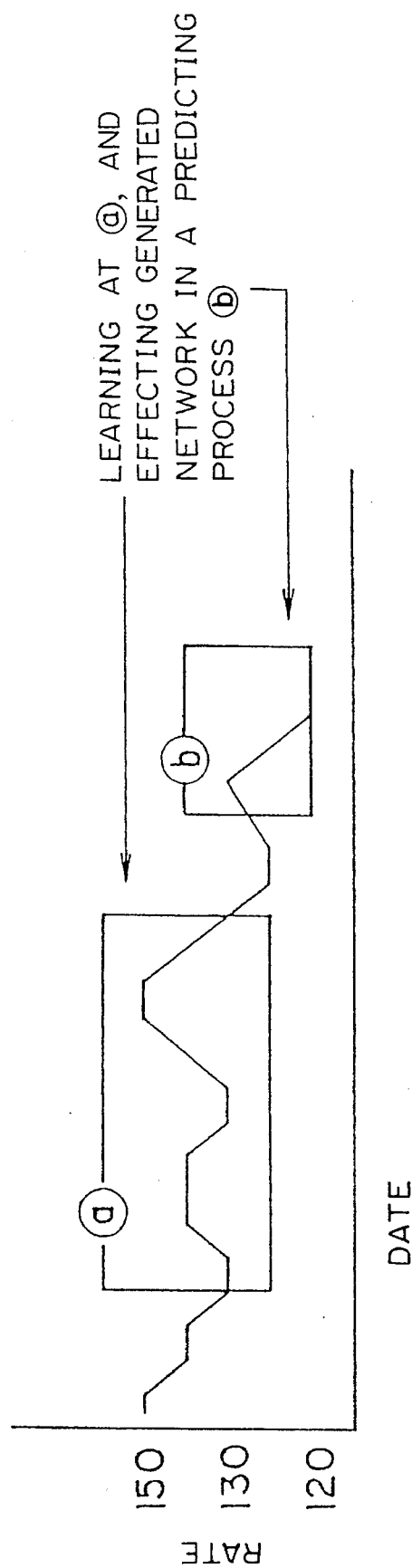
FIG. 12 shows the prediction of an exchange rate obtained by a financial affairs predicting system.

FIG. 12 shows an application in which the an exchange rate is effectively predicted according to the learning method of the present invention. The financial market shows ups and downs in time series. For example, a dollar is traded for 130 yen, which is not fixed at all. The exchange rate in the future can be effectively predicted by calculating with a rate of change in such a predicting process based on accumulated data. In FIG. 12, a predicting process is effectively performed in ⓑ according to a learning process in ⓐ and a resultant network. That is, the value in the latter portion in ⓐ and the value in ⓑ show different absolute values, but the change at each of the above described portions look similar to each other. The present invention specifically works effectively on such cases. Systems associated with financial prediction to be outputted in time series can be, for example, a yen-dollar exchange rate predicting system, an Euro-yen interest predicting system, etc.

Then, the normalization of an exchange rate and of the rate of change of an exchange rate is explained as follows. When an actual value of an exchange rate is normalized, a normalized value can be calculated by the following equation assuming that a dollar is traded for 132.05 yen with the maximum value of 133.85 yen and the minimum value of 129.30 yen.

$$\frac{132.50 - 129.30}{133.85 - 129.30} \times 0.8 + 0.1 = 0.5835$$

When the rate of change of an exchange rate is normalized, the normalized value can be calculated by the following equation assuming that the rate of change of the exchange rate at a predetermined time is 0.003 with the user-determined maximum value of 0.05 and the minimum value of −0.05.

$$\frac{0.03 - (-0.05)}{0.05 - (-0.05)} \times 0.8 + 0.1 = 0.524$$

FIGS. 13A and 13B respectively show an example of an input to an input unit and an output from an output unit in an exchange rate predicting system as an example of a financial predicting system. The configuration of the exchange rate predicting system is the same as that shown in FIG. 5, and the process flowchart is the same as that shown in FIG. 6. Therefore, the detailed explanation is omitted here.

In FIG. 13A, the number of input units is 67. Among them, 33 units contain the information on an exchange rate, that is, the data of an exchange rate. An exchange rate can indicate the maximum, minimum, and ending values in a day. First, actual values for the day are entered. The rate of changes of the latest five days to the respective previous days are entered. For example, assuming that the present day is the 24th, the rate of changes of the 21st to the 20th, the 22nd to the 21st, the 23rd to the 22nd, and the 24th to the 23rd, that is, a total of four rate of changes, are calculated for the above described three kinds of values, and the results are applied to 12 input units.

The fluctuation width of exchange rate values is calculated for the above described three kinds of values of each of the latest three months. The "fluctuation width" indicates the difference between the maximum value and the minimum value in each month. The fluctuation width is entered to 9 input units.

A tendency value is calculated for each of the latest 3 months. For example, the tendency value of ending values is obtained by dividing the difference between the ending value of the last day and the ending value of the first day of each month by the ending value of the first day. Likewise, the tendency values for the maximum and minimum values of an exchange rate are calculated. As a result, a total of nine tendency values are obtained and separately applied to input units.

Input data associated with interest, that is, interest information, includes U.S. dollar interest, yen interest, and overnight interest. For the U.S. dollar interest and yen interest, the tendency value and the fluctuation width of each of the latest 3 months are entered. That is, 6 interest tendency values and 6 interest fluctuation width values are applied to input units.

Concerning overnight interest, the fluctuation width of each of the latest three months, and the rate of change of an average value of each of the latest four months to the respective previous month are entered. As a result, the number of input units receiving interest information is six for tendency values, nine for fluctuation width, and three for rate of changes. A tendency value and fluctuation width of interest information can be defined in the same way as in an exchange rate.

Furthermore, input units receive rate of changes of government bond, price, index, stock market. Among all the information, the price information shows the market price of a specific item. Likewise, the index information shows the index data associated with the price of a specific item. In response to these four kinds of data, four rate of changes of each of the latest five days to the respective previous days are applied to a total of 16 input units.

As shown in FIG. 13B, the number of output units is 7, and data are outputted as rate of changes of the next day, that is, the maximum and minimum values of the exchange rate. Additionally, the rate of change of the ending value of each of the next to the fifth days is outputted as a rate of change on the basis of the present value. The number of units in the hidden layer is, for example, 10.

FIG. 14 shows an example of the comparison of a predicted value with an actual value. It also shows an absolute value of the difference and shows whether or not the upturn or downturn was predicted right.

Figure 15:
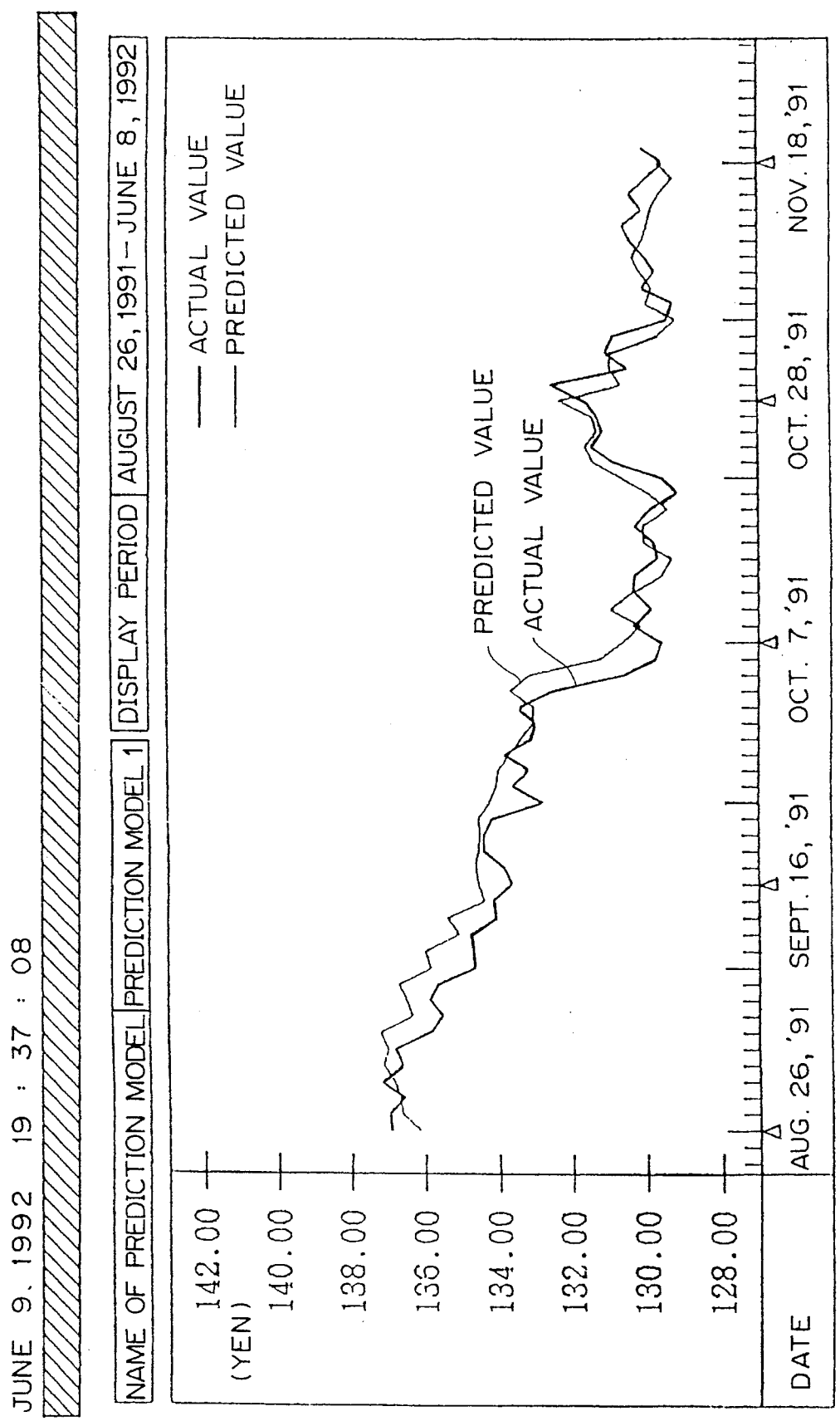
FIG. 15 shows a graph showing the comparison of a predicted value with an actual value.

FIG. 15 shows an example of a graph showing the comparison of a predicted value with an actual value. It clearly shows that the predicted values match the actual values in general tendency. For example, the displayed period indicates that the present invention is applied based on the actual data in the past. It does not indicate that the prediction is outputted during the displaying period.

As described above, according to the present invention, learning data can be effectively used in predicting a tendency generally indicating changes in time series by using a rate of change as learning data in a predicting system operated through a layered neural network. As a result, a learning process is executed with learning data much reduced and the learning time considerably shortened.

The descriptions given above mainly relates to the embodiments in which the learning method according to the present invention is applied to an exchange rate predicting system. However, it is obvious that the present invention is not limited to this application, but can be widely applied to, for example, a prediction of a tendency generally indicating a somewhat regular change such as sales amount, waveforms, and other general matters. For example, if the number of customers visiting a branch office in a financial business can be correctly predicted, then the provision of bank notes, the number of telling machines, the assignment of workers, can be appropriately determined. Additionally, if the predicting system can be properly applied to the prediction of the sales amount of a manufacturer, wholesaler, etc., then the amount of purchase, the number of workers, etc. can be correctly determined. Furthermore, if the predicting system can be effectively applied to a prediction of the tendency of the stock market and the merchandise index of jewelry and valuable metal, raw oil, grain, sugar, etc., then the purchase amount and timing can be efficiently determined.

In addition to the above described predicting systems, the present invention provides the function of predicting the next rate of change through the learning of rate of changes. Using this function, it automatically generates the next rate of change learning pattern to perform a further learning process so that a smooth operation can be obtained. For example, liquid can be controlled, that is, a flow of liquid can be controlled and operated by a control valve, etc.

As described above, the present invention is applicable not only to the financial business, but also to the traders and manufacturers. Furthermore, it can be applicable to an industrial market where fluctuation control is required.

What is claimed is:

1. A learning system comprising:

a layered neural network which includes an input layer, at least one hidden layer, and an output layer;

rate of change calculating means connected to receive input data for calculating the rate of change of said input data by dividing a difference between two input data by one of said two input data and outputting calculated rate of change data; and network generating means connected to receive said input data and to receive said calculated rate of change data from said rate of change calculating means, for controlling learning processes performed through said layered neural network by applying said input data and said calculated rate of change data as learning data to said neural network, and for establishing a layered neural network, a weight value of said layered neural network being determined for said learning data.

2. The learning system according to claim 1, wherein said input data are time series data; and said two input data are collected at two different times in said time-series data.

3. The learning system according to claim 2, further comprising:

normalizing means for normalizing said learning data to form normalized data in a range from 0.1 to 0.9, and for outputting said normalized data to said network generating means.

4. The learning system according to claim 1, further comprising:

normalizing means for normalizing said learning data to form normalized data in a range from 0.1 to 0.9, and for outputting said normalized data to said network generating means.

5. A predicting system comprising:

a layered neural network which includes an input layer, at least one hidden layer, and an output layer, said layered neural network producing a recognition result;

rate of change calculating means connected to receive input data, for calculating the rate of change of said input data by dividing a difference between two input data by one of said two input data and outputting calculated rate of change data;

network generating means connected to receive said input data and to receive said calculated rate of change data from said rate of change calculating means, for controlling learning processes performed through said layered neural network by applying said input data and said calculated rate of change data as learning data to said neural network, and for establishing a layered neural network, a weight value of said neural network layer being determined for said learning data; and network recognizing means for obtaining, using said layered neural network said recognition result outputted by said layered neural network as a prediction result in response to input recognizing data.

6. The predicting system according to claim 5, wherein said input data are time series data; and said two input data are collected at two different times in said time-series data.

7. The predicting system according to claim 6, further comprising:

normalizing means for normalizing said learning data to form normalized data in a range from 0.1 to 0.9, and for outputting said normalized data to said network generating means, and for normalizing input recognizing data to form normalized recognizing data in a range from 0.1 to 0.9, and for outputting said normalized recognizing data to said network recognizing means.

8. The predicting system according to claim 5, further comprising:

normalizing means for normalizing said learning data to form normalized data in a range from 0.1 to 0.9, and for outputting said normalized data to said network generating means, and for normalizing input recognizing data to form normalized recognizing data in a range from 0.1 to 0.9, and for outputting said normalized recognizing data to said network recognizing means.

9. The predicting system according to claim 5, further comprising:

rate of change restoring means for restoring an actual value from a prediction result outputted using said network recognizing means and represented as a rate of change.

10. The predicting system according to claim 5, wherein said predicting system can be used as an exchange rate predicting system;

wherein said input layer in said layered neural network receives input data comprising exchange rate, interest, government bond, market price, price index, actual value, and/or rate of change of a stock market; and wherein said output layer in said layered neural network output data predicting maximum, minimum, and ending values of an exchange rate.

* * * * *